(12) United States Patent
Grenet et al.

(10) Patent No.: US 12,169,804 B1
(45) Date of Patent: Dec. 17, 2024

(54) SYSTEM AND METHOD FOR DYNAMIC CONTEXT SENSITIVE GUIDANCE

(71) Applicant: UIPCO, LLC, San Antonio, TX (US)

(72) Inventors: Eric Jason Grenet, Boerne, TX (US); Brian Christopher Hawes, San Antonio, TX (US); Paul Christopher Blanchard, San Antonio, TX (US); Phillip E. Marks, San Antonio, TX (US); Jeffrey Walton Easley, San Antonio, TX (US); Douglas Austin Johnson, San Antonio, TX (US); Katrina Marie Zell, San Antonio, TX (US); Julia Yilan Kennedy, Austin, TX (US); Lawrence Paul McDermott, Jr., San Antonio, TX (US); David Morley, San Antonio, TX (US); Christopher Collin Campbell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 274 days.

(21) Appl. No.: 17/657,407

(22) Filed: Mar. 31, 2022

Related U.S. Application Data

(60) Provisional application No. 63/169,076, filed on Mar. 31, 2021.

(51) Int. Cl.
*G06Q 10/0639* (2023.01)
*G06F 9/451* (2018.01)
*G06Q 10/0631* (2023.01)

(52) U.S. Cl.
CPC ......... *G06Q 10/0639* (2013.01); *G06F 9/453* (2018.02); *G06Q 10/063112* (2013.01)

(58) Field of Classification Search
None
See application file for complete search history.

(56) References Cited

U.S. PATENT DOCUMENTS

| | | | |
|---|---|---|---|
| 5,595,685 A * | 1/1997 | Takiguchi | C07D 277/22 548/146 |
| 11,023,442 B2 * | 6/2021 | Pandya | G06F 11/3476 |
| 11,113,459 B1 * | 9/2021 | Olsson | G06N 20/00 |
| 11,249,741 B2 * | 2/2022 | Sanan | G06F 8/61 |

(Continued)

OTHER PUBLICATIONS

Nurmi J. Engaging Users in the Behavior Change Process With Digitalized Motivational Interviewing and Gamification: Development and Feasibility Testing of the Precious App. JMIR Mhealth Uhealth. Jan. 30, 2020;8(1):e12884. doi: 10.2196/12884.PMID: 32003750; PMCID: PMC7055776. (Year: 2020).*

*Primary Examiner* — Stephanie Z Delich
(74) *Attorney, Agent, or Firm* — Plumsea Law Group, LLC

(57) ABSTRACT

A method and system of providing users with dynamic content about a specific task during access of an application based on previous in-app activity by the app's community of users for the task. The system identifies experienced user activity that represents an efficient performance of the task. The activity is stored in a repository for use by a dynamic content generation module. When subsequent users appear to need assistance in performing the task, the system can present content that is based on the more experienced users' activity. As additional data is collected, this content can be updated.

20 Claims, 11 Drawing Sheets

(56) References Cited

U.S. PATENT DOCUMENTS

| | | | |
|---|---|---|---|
| 11,295,375 B1* | 4/2022 | Chitrapura | G06Q 50/01 |
| 11,410,075 B2* | 8/2022 | Pal | G06F 16/90324 |
| 11,538,556 B2* | 12/2022 | Rothberg | G16B 40/20 |
| 11,709,690 B2* | 7/2023 | Lipka | G06F 3/04815 |
| | | | 715/705 |
| 2019/0303107 A1* | 10/2019 | Kelly | G06F 9/453 |
| 2019/0324778 A1* | 10/2019 | Bhowmick | G06F 9/453 |
| 2020/0410392 A1* | 12/2020 | Verma | G06N 3/044 |
| 2022/0414527 A1* | 12/2022 | Pandya | G06F 9/4881 |

* cited by examiner

FIG. 3

ISSUE-00003324

HR-2017-New employee hired with the incorrect salary ✕

Issue Owner: Sherie Masters
Email
(210) 555-2772
View Delegate

Initial Approver: Peter Chung
Email
(210) 555-2222

Final Approver: Terry Benton
Email
(210) 555-4554

⏱ Time in Phase: 5 Days Left ○ | ⚠ Issue Status: Pending Approval ○ | 📅 Due Date: Dec 28th 2019 ○ | Currently with: Peter Chung Action Plan(s)

− Special Categories Standards Framework ⚠

Action ID: 00003425
    Action Type: Control Self Assessment
    Status: Open
    Action Owner: Scott Parker
    Action Plan Delegate: Mark Phillips
    Action Approver: Michelle Gore Comments:

+ Affiliate Program ✓

+ Non - Special Categories Standards Framework ✓

+ Non - Affiliate Program ✓

SYSTEM AND METHOD FOR DYNAMIC CONTEXT SENSITIVE GUIDANCE

CROSS-REFERENCE TO RELATED APPLICATION

This application claims the benefit of U.S. Provisional Patent Application Ser. No. 63/169,076 filed on Mar. 31, 2021 and titled "System and Method for Dynamic Context Sensitive Guidance", the disclosure of which is incorporated by reference in its entirety.

TECHNICAL FIELD

The embodiments relate generally to methods and systems for modifying information presented to a user during use of a software application, and specifically to adjusting the guidance provided to a user based on previous in-app activities of skilled users of the application.

BACKGROUND

User interfaces for APIs (application programming interfaces) can be used to facilitate an end user's interaction with, for example, a distributed computing environment (e.g., a web-based application), or an application residing wholly on a single computer system (e.g., a stand-alone application). Some APIs represent platforms for use by large-scale commercial or business enterprises. In such cases, the platform is supported by a complex and distributed environment. The platform may offer users access to a wide range of functionalities.

However, some users, particularly those new to the platform, may have trouble interacting with the API when there are so many options and features. For example, a user may wish to perform a particular task that has been made available through features provided by the platform. As they begin the task, the inexperienced user will likely devote far more time in understanding and completing each step than a more proficient user would. It may require several interaction events with the task process in order for a user to be able to skillfully complete the task.

Although there have been various methods developed by platform developers to offer assistance to such users, the content typically remains static unless changes to the content are made by the developer or other information technology managers. This static content can be impractical for the real-world users who are engaging with the platform day-to-day.

There is a need in the art for a system and method that addresses the shortcomings discussed above.

SUMMARY

In one aspect, a method of dynamically modifying information presented to a user of an application is disclosed. The method includes a first step of generating, at a first time, first content for a first message related to a first in-app task, and a second step of receiving, at a second time, first activity data for a first user corresponding to a successful completion of the first in-app task. In addition, the method includes a third step of generating, at a third time, second content to replace the first content based at least on the first activity data, and a fourth step of receiving, at a fourth time, second activity data for a second user corresponding to a launch of the first in-app task. Furthermore, the method includes a fifth step of automatically presenting the first message including the second content to the second user.

In another aspect, a method of providing in-app assistance to a user includes a first step of receiving first activity data for a first user corresponding to a successful completion of a first in-app task, and a second step of assessing the first activity data to generate a first efficiency rating. In addition, the method includes a third step of determining that the first efficiency rating is above a first threshold, and a fourth step of presenting, to a second user engaged in the first in-app task, a tutorial regarding the first in-app task, the tutorial being based on the first activity data.

In another aspect, a system is disclosed for dynamically modifying information presented to a user of an application. The system comprises a processor and machine-readable media including instructions which, when executed by the processor, cause the processor to generate, at a first time, first content for a first message related to a first in-app task, and to receive, at a second time, first activity data for a first user corresponding to a successful completion of the first in-app task. The instructions further cause the processor to generate, at a third time, second content to replace the first content based at least on the first activity data, and to receive, at a fourth time, second activity data for a second user corresponding to a launch of the first in-app task. Furthermore, the instructions cause the processor to automatically present the first message including the second content to the second user.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 3 is an example of a platform interface for creating tasks, according to an embodiment;

FIG. 4 is an example of a platform interface displaying details for a task, according to an embodiment;

DESCRIPTION OF EMBODIMENTS

Figure 1:
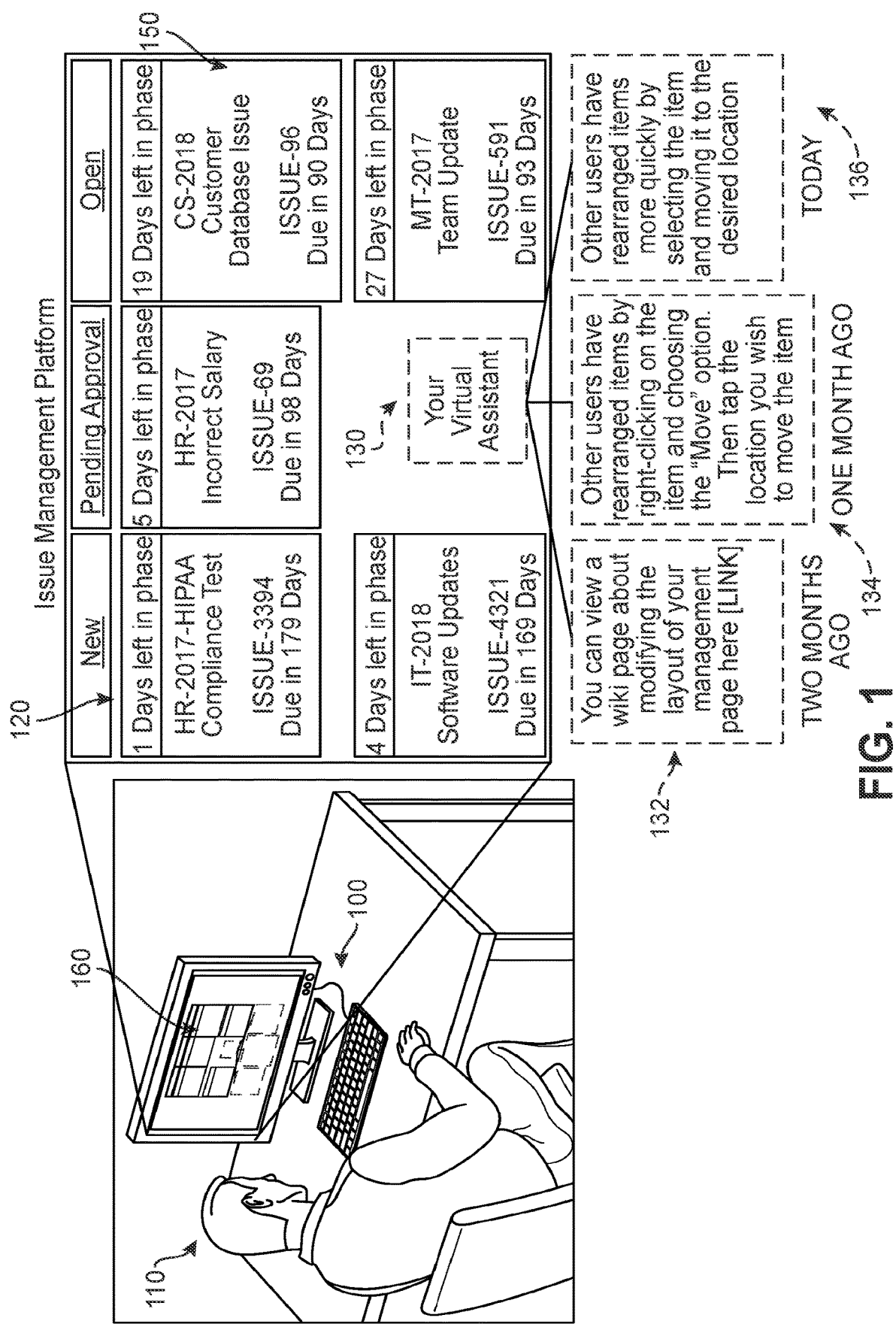
FIG. 1 is an illustration of an example of a user accessing a task manager platform, according to an embodiment.

The embodiments provide a system and method for identifying proficient and/or efficient task performance data for users of an application and displaying content to subsequent users based on the identified performance data. The proposed system and method provide an application interaction experience that is dynamically modified to ensure the information available for using various app functions and features is up-to-date and beneficial for users. In one example, the system and method enable the app to offer instructions regarding the most efficient path for completing an in-app task based on the approach that has been taken by previous experienced users to complete the same task. These instructions can change over time based on an ongoing collection of data from users who perform the task most efficiently.

Thus, inexperienced or otherwise less skilled users are offered guidance that is automatically updated when more proficient users apply additional and/or alternative techniques that improve their task performance. This guidance is generated without requiring manual input from a developer or other IT manager regarding the content. In one embodiment, the proposed systems can make use of deep learning networks and machine learning algorithms to optimize the app's presentation of content. In some embodiments, a model determines which user activity should be submitted to the model for a specific task, and a deep learning network determines what content provides the most efficient approach for the task based on the activity data. The app can then present options and information that are most likely to be of relevance to the novice user based on these determinations, thereby significantly improving the user's in-app experience.

As used herein, the term "user", "customer", and/or "member" should be understood tor refer to any end-user or person accessing an application configured with some or all of the features described herein. In addition, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" or "triggering event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Furthermore, graphical user interfaces (GUIs) can be used to present information to a user in the form of icons, graphics, or other types of interactive elements. Such interactive elements are generally associated with a particular action or command. A user typically has to supply an input to a computing system that is associated with the interactive elements presented on the graphical user interface to execute the particular action or command. As used herein, "interactive element" broadly includes a wide variety of graphical tools or components, such as graphical icons, graphical menus, graphical buttons, hyperlinks, images, and any other element which can be displayed on a graphical display and associated with or otherwise linked to an action or process that is to be performed upon activation of an interactive element.

Referring now to FIG. 1, for purposes of introduction, a first user 110 of a first app 160 is shown viewing a first user interface ("first interface") 162 via a first device 100. As a general matter, the first device 100 can include an electronics unit comprising a plurality of different components, such as a user interface component (e.g., a touchscreen display, keyboard, mouse, speakers, etc.), a user interface module, a processor, and/or a communication module. For purposes of this example, first device 100 can be a desktop computer, laptop, tablet, or other computing device configured for connection to a network. Furthermore, the first device 160 includes one or more processors and memory. Memory may comprise a non-transitory computer readable medium. Instructions stored within memory may be executed by the one or more processors. A communication module may allow the first device 160 to communicate wirelessly. In different embodiments, the first device 160 may communicate with a mobile computing device, wireless devices, and/or with networked computers, for example over the internet. In this case, the communication module is a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In some embodiments, the app is available at least in part as a local resource stored on the first device 100, while in other embodiments, some or all features and modules of the system are made available via a remote cloud service or network. In some cases, an optional authentication page is presented to allow the first user to access the user account that is linked to the first app 160. For purposes of this example, the first app 160 provides various enterprise task management services, as will be discussed below in FIGS. 3 and 4. However, in other embodiments, the first app 160 can be any other type of application configured for one-time or recurring use by users of the app. In FIG. 1, the first interface 162 displays a plurality of items identified as "issues" that are associated with the present user, with the issues being listed under various categories (e.g., "New", "Pending Approval", "Open", etc.). In different embodiments, a user may wish to interact with the first interface 162 to perform one or more tasks. In this case, the task the first user 110 is attempting to perform is a reorganization of one or more issue boxes 120 being displayed in the first interface 162 (e.g., a "rearrange layout" task). The example task shown is relatively simple for purposes of illustration. However, it may be appreciated that the discussion herein can be applicable to much more complex, multi-step tasks. Upon detection of a particular selection or sequence of inputs by the fist user 110 (a "triggering event"), the system can be configured to offer information that may be of assistance. In one embodiment, the information can be presented via a virtual assistant service, as shown in FIG. 1. However, in other embodiments, the app can simply present the information as part of the user interface itself in response to the triggering event.

In different embodiments, based on previously received data corresponding to prior in-app activity from one or more users, the first app 160 can be configured to present different content to a user at different times. In FIG. 1, the reference letter "A" indicates content associated with a first visit to this particular feature (rearrange layout) of the first app 160 (presented to the user on a first date), the reference letter "B" indicates content associated with a second visit to this particular feature (rearrange layout) of the first app 160 (presented to the user on a second, different date), and the reference letter "C" indicates content associated with a third visit to this particular feature (rearrange layout) of the first app 160 (presented to the user on a third, different date). In this case, it may be understood that the three dates occurred over the past few months or more. In this example, the first date occurred two months ago, the second date one month ago, and the third date is today. The visits are illustrated as being by the same user, but it should be understood that each visit can have occurred by different users.

As shown in FIG. 1, the first user 110 can access first app 160 at different times. When first user 110 accessed the first app 160 at the first time (two months ago) and attempted to rearrange the issue box layout, he was presented with a first message 132 ("You can view a wiki page about modifying the layout of your management page here [LINK]"). When first user 110 accessed the first app 160 at the second time (one month ago) and attempted to rearrange the issue box layout, he was presented with a second message 134 ("Other users have rearranged items by right-clicking on the item and choosing the "Move" option. Then tap the location you wish to move the item"). Finally, when first user 110 accessed the first app 160 at the third time (today/the present) and attempted to rearrange the issue box layout, he was presented with a third message 136 ("Other users have rearranged items more quickly by selecting the item and moving it to the desired location").

In other words, at each subsequent session, the user is presented with different content, yet each message is remains directed to achieving the same task. The information is context-sensitive, based on the actions the user is engaged in at that time, as well as dynamic. For purposes of this application, dynamic refers to content for a specific feature that is automatically modified from one time to another time based on collective in-app activity by some users of the app's community of users. In contrast, static refers to content that is usually the same from one time to another, or is modified in response to manual input. In this example, at the first time, the first user 132 is shown content that is relatively generalized or broad, simply referring the user to a wiki page where he may or may not obtain the knowledge needed to complete the task, per the app default programming. However, between the first time and the second time, the layout edit feature is utilized by a first plurality of users (in the app user community). The activities associated with the layout edit feature is captured and processed by the system. User activity that is further associated with a successful task completion was used to identify particular patterns or actions that advanced the task goals and increased the likelihood of an efficient task performance. The most effective of these actions are then presented to the first user 110 as modified content in second message 134.

It may be appreciated that the second message 134 is relatively more direct or on point than the first message 132. In this example, the second message 134 offers a specific set of steps that the user can follow to successfully perform the given task, based on the experience of other users before him. Such dynamic content can provide novice users with an accelerated learning path in their interaction with the app. In addition, the system can continue to acquire new data over time. For example, between the second time and the third time, the layout edit feature continues to be utilized by a second plurality of users (of the app user community) that may include members of the first plurality of users. The ongoing activity connected to the layout edit feature is again captured and processed by the system. User activity that is associated with successful task completion is used to identify particular patterns or actions that advanced the task goals and increased the likelihood of an efficient task performance. The most effective of these actions—if deemed more efficient or user-friendly than the previous process—is then presented to the first user 110 as modified content in third message 136. In this example, the third message 136 also offers a specific set of steps that the user can follow to successfully perform the given task, based on the experience of other users before him. However, the steps are more effective and allow the user to complete the task in a shorter time.

Figure 2:
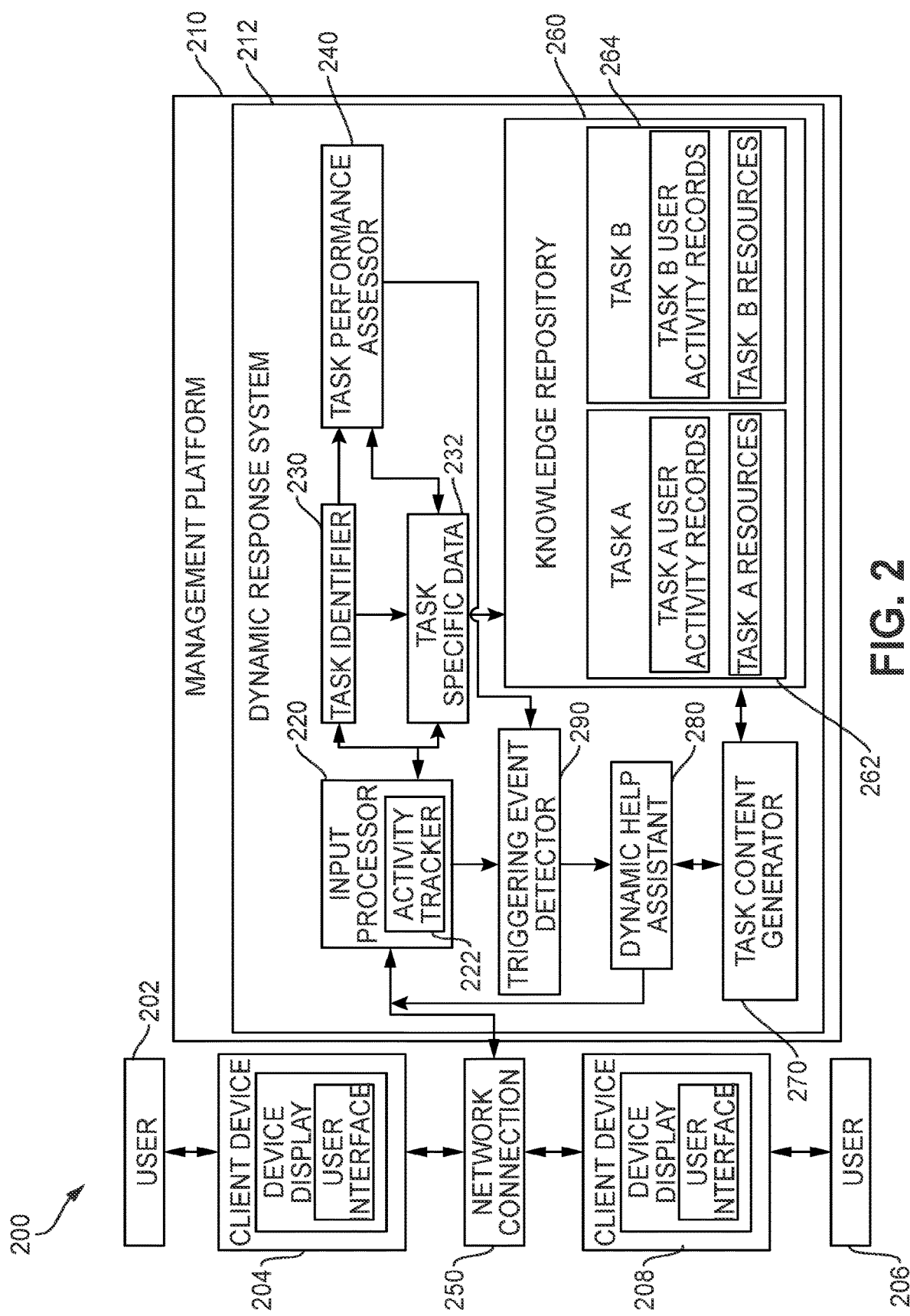
FIG. 2 is a schematic diagram of a system for automatically and dynamically providing assistance for a task in an application based on previous users' in-app activities, according to an embodiment.

In order to provide the reader with a greater appreciation of the embodiments, FIG. 2 depicts an overview of an embodiment of a context sensitive dynamic response environment ("environment") 200 in which user activities are tracked and collected and used to determine which content should be presented to a user during a particular in-app task process. As will be discussed below, in different embodiments, the environment 200 includes an intelligent task content generator ("task content generator") 270 configured to provide the most up-to-date and relevant content to the user during each access session.

As shown in FIG. 2, the environment 200 includes a first client computing device ("first device") 204 for a first user 202, and a second client computing device ("second device") 208 for a second user 206, each configured to communicate with a management platform software application ("platform") 210 over a network connection 250. The two devices are included for purposes of representation of a larger app user community. In addition, while the various components of the platform 210 are shown as being accessed through a cloud network and/or stored on a cloud-based server in FIG. 2, in other embodiments some or all components described herein can be reside in the client device(s) and/or a remote server.

In different embodiments, each client device includes a device display ("display") that can present information and media for the platform 210. As noted above, in some embodiments, platform 210 can represent an enterprise management software product that is associated with an organization, business, or other entity (see FIGS. 3 and 4). For example, the first user 202 and second user 206 can receive and send information through a user interface that may be presented on their device display. The user interface and display may represent a common component or may represent separate physical or functional components. In some embodiments, display may be a touchscreen, allowing the customer to interact with the user interface directly by touch. The user interface may refer to an operating system user interface or the interface of one or more software applications that may run on the client devices, such as platform 210.

In different embodiments, the users 202 and 206 may, based on the services or features provided by platform 210, access platform 210 in order to perform one or more tasks. In some embodiments, the platform 210 can represent an interactive application that provides a site from which the user can create and maintain an account, access information and options related to the entity and its products or services, perform various operations, review and/or modify their account details, and/or communicate with other app users. For example, a user can enter various inputs via client device that are received by an input processor 220 of a dynamic response system ("system") 212 of the platform 210. In some embodiments, the system 212 will generate a log of these inputs and selections via a user activity tracker ("tracker") 222. In other embodiments, the tracker 222 may be a component that is external to system 212 or platform 210.

The data the tracker 222 receives can be processed by a task identifier 230, which identifies the specific task being performed or feature being accessed. In some embodiments, the tracker 222 can be configured to automatically transfer the task data in real or near real-time to the task identifier 230 upon the completion of a specific task by the user, and/or in response to specific events that occur during the user's access session. The data directed to the identified task is isolated by a task specific data selection module 232. In addition, the processed task data is shared with a task performance assessor 240 in order to assess the efficiency of the user in performing the specific task and generating a performance rating based on the identified task. In other words, each rating is determined within the task context. Thus, one user can perform a first task and a second task, and receive a high rating for the first task, and a low rating for the second task, based on the established frame of reference for each task.

In different embodiments, the rating can be based on previous user activity for the same task, a preestablished performance baseline, whether the task was completed with few or no errors, the account type for the user, and/or the length of time the user needed to complete the task, among other factors. If the rating for a particular user is above a preestablished threshold (i.e., is a task completion event by a high-performing, experienced, or otherwise skilled end-user and/or within a particular task-specific timeframe) the task performance assessor 240 can signal the task specific data selection module 232 to send the user data to a knowledge repository 260, where it will be stored with other data and information pertaining to the specific task. In another example, if a user is a certified user or certified expert for the platform, which is recognized by the system, his or her activity data may be automatically stored in the knowledge repository (e.g., without an assessment step). In some embodiments, the knowledge repository is configured to store the information as a short or long-term record associated with the specific task. If, on the other hand, the rating for a particular user is below the preestablished threshold (i.e., is a task completion event by a slow, novice, or otherwise un-skilled end-user and/or exceeded a particular task-specific timeframe) the task performance assessor 240 can signal the task specific data selection module 232 to disregard the data. In one embodiment, a low rating can also be provided to a triggering event detector 290 to determine whether the current user should be presented with content about the selected task.

As shown in FIG. 2, the activity data will be stored in a module dedicated to collecting information about the specific task. For purposes of illustration, two different tasks (Task A 262 and Task B 264) are depicted, each including highly rated user activity records and, in some optional embodiments, additional resources (e.g., tutorials, wikis, etc.) related to the task. In different embodiments, the information stored in the knowledge repository 260 can be used as training data for the task content generator 270. The task content generator 270 provides output for use by a dynamic user experience module ("dynamic module") 280, also referred to as a dynamic help assistant. The dynamic module 280 can be configured to automatically present content that has a high probability or likelihood of best serving the user's immediate needs in their current app access session. For example, when input processor 220 receives a login request, the platform 210 may identify the account associated with the user. This information is provided to the triggering event detector 290, and if the user activity corresponds to performance by a new or otherwise inexperienced user for the selected task, the dynamic module 280 can be activated, causing the task content generator to 270 determine the most highly rated approach or common approach from the knowledge repository 260 for the task. The relevant information from the task component is used as input for the intelligent model.

In some embodiments, in cases where there has been no or otherwise insufficient user activity at the time of the user login for the system to determine what content should be provided, it can be understood that the system can be configured to present a default or standard content (e.g., based on the task-specific general resources). In some cases, such data can serve as initial training data for the task content generator 270.

Thus, in different embodiments, the task content generator 270 is configured to receive highly rated activity data as input for a deep reinforcement learning model ("model"). In some embodiments, the deep reinforcement learning process may use a Q-Learning process, Deep Q Network (DQN), a Double Deep Q Network (DDQN), or other kinds of deep learning networks. The training data functions as the "environment" for training the dynamic help assistant 280. The set of actions the assistant may take during the training process are constrained by an action screening process. Rewards for each action in the learning process are dynamically generated based on information related to the current task (e.g., percent of task completion, time taken for task completion, user task history, etc.). In a reinforcement learning system, the assistant 280 interacts with the user activity identified by the task content generator 270. The reinforcement learning system may be characterized by a repeating process where the assistant 280 receives content at time t of some aspect of the state of the task. In some cases, the content may include information related to one or more user's most recent task performance. In addition to receiving content, the assistant 280 may receive a reward Rt. In some cases, this reward could be explicitly provided by an end-user as feedback regarding the value of the content. In other cases, this reward could be determined by assistant 280 according to information about the subsequent actions taken by the user to whom the content was presented (e.g., when new or changing usage patterns by the user are detected).

In one embodiment, if the provided content successfully displayed the options and/or features the user had desired, as reflected by data collected by feedback and/or subsequent user activity, the model's association is reinforced. For example, the platform 210 may request that the user submit feedback regarding their experience, including whether the proffered content was aligned with their intended tasks during the current (or later) access sessions, or via communications to the user at a later time asking about their experience. On the other hand, if the user avoids the options provided by the content and instead immediately or soon after navigates to a different feature, menu, or site page, or closes the task interface, the model can remove the association/link or assign the association a lower probability or likelihood of representing the content with the desired options/features. Based on the feedback and model can reassess the value of that content for future instances of the same or similar task. In some embodiments, the user feedback may alternatively or additionally be stored in the repository.

For purposes of illustration, an example flow through environment 200 is provided. In this example, the first user 202 has engaged in a first in-app task (Task A) at a first time during an app access session. The activity associated with Task A is collected and evaluated to determine a performance rating that is above the preestablished threshold for the task by the task performance assessor 240. Thus, the data is stored in the knowledge repository 260 within the record for Task A 262. At a later, second time, the second user 206 engages in the same first in-app task (Task A). Their activity is collected and evaluated by the triggering event detector 290 to determine that the user should be shown content related to Task A. The triggering event detector 290 will send a signal to the dynamic help assistant 280 to begin interacting with the second user 206 about Task A. The dynamic help assistant 280 requests the content from the task content generator 270, which outputs the content based on the most recent and/or highly rated set of records for Task A in the knowledge repository 260, in this case including the data for first user 202. This content is then presented to the second user 206, enabling the second user 206 to take advantage of the experience and knowledge of the first user 202. It may be appreciated that first user 202 represents one of many in the community of users for the platform 210 whose activity has been used by the system 212 to generate content.

It should be understood that in other implementations, environment 200 can include additional or fewer modules or can include one or more additional computing devices or related server devices. The modules of environment 200 can be associated with the various local computing devices and, for example, can be disposed within the computing device. In alternative implementations, the modules of environment 200 can include independent computing devices that are coupled to, and in data communication with, the local computing devices. As used in this description, the term "module" is intended to include, but is not limited to, one or more computers, processing units, or devices configured to execute one or more software programs that include program code that causes a processing device(s) or unit(s) of the computer to execute one or more functions. Processing units can include one or more processors (e.g., microprocessors or central processing units (CPUs)), graphics processing units (GPUs), application specific integrated circuits (ASICs), or a combination of different processors. In alternative embodiments, systems and modules can each include other computing resources/devices (e.g., cloud-based servers) that provide additional processing options for performing one or more of the machine learning determinations and calculations. The processing units or devices can further include one or more memory units or memory banks. In some implementations, the processing units execute programmed instructions stored in memory to cause system, devices, and modules to perform one or more functions described herein. The memory units/banks can include one or more non-transitory machine-readable storage mediums. The non-transitory machine-readable storage medium can include solid-state memory, magnetic disk, and optical disk, a random-access memory (RAM), a read-only memory (ROM), an erasable programmable read-only memory (e.g., EPROM, EEPROM, or Flash memory), or any other tangible medium capable of storing information.

Figure 3:
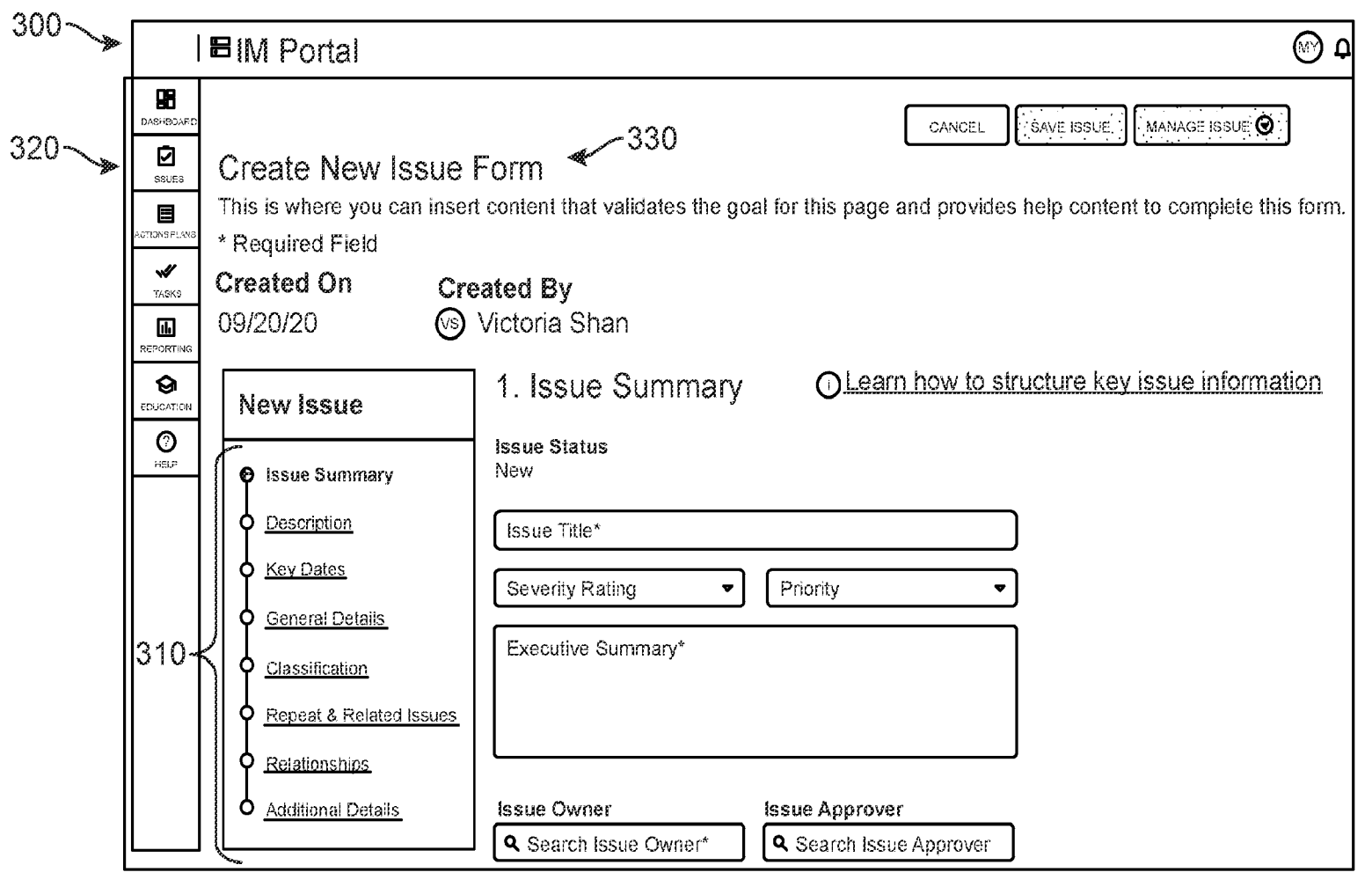

Referring now to FIGS. 3 and 4, one example of an implementation of a platform with an app interface configured with a dynamic user experience system ("system") based on previous users' in-app task specific activities is presented. In FIG. 3, an example schematic diagram illustrates an issue tracker portal interface 300. The portal interface 300 includes a toolbar 320 with various menu items and shortcuts (e.g., Dashboard tab, Issues tab, Action Plans tab, Tasks tab, Reporting tab, Education tab, Help tab, etc.). In this example, the user is viewing an issue creation page 330 which represents one type of in-app task that can be performed. The task includes multiple stages (e.g., issue summary, description, key dates, general details, classification, repeat and related issues, relationships, additional details) that can be completed by the user. As another example, an issue panel 400 is depicted in FIG. 4. The issue panel 400 may be presented to the user in response to an issue selection from the Issues tab or be automatically shown when the issue is urgent or is dated for the current time. In some embodiments, the issue panel 400 can represent a comprehensive summary of the issue, including pertinent details such as but not limited to Issue owners, initial approver, final approver, Time in phase (time remaining for issue to be dealt with/closed), issue status, due date, currently assigned to, Action plans, etc.

In different embodiments, the platform can be configured to provide an enhanced issue management experience. In one embodiment, the platform serves as a connected enterprise issue management tool that can aggregate information from numerous systems, reduce switching between tools, and decrease the risk of human error to allow a FLOD (First Line of Defense) to more efficiently and effectively manage issues. In addition, the platform portal can be configured to present a curated view of the information contained within the metric stream specific to a user, facilitating communication and collaboration across teams, and highlighting and enabling users to act upon the most pressing issues and issue related tasks. The tool can reduce the number of systems users interact with, enter data into and the number of clicks required to perform their duties.

Furthermore, in some embodiments, the platform can provide a more user centered view of issue management by (a) making available a dashboard for users to interact with their specific issues, action plans and tasks (e.g., see FIG. 3), (b) increasing understanding of most pressing topics by prioritizing them on user dashboard, (c) driving prioritization of actions for issue progression, (d) enabling intuitive collaborations, (e) permitting issue stakeholders to interact with the issue or action plan in the same tool, (f) offering a comments and change history that allows users to view the work and track the progress of the issue, (g) generating notifications informing teammates of updates, questions, actions, etc., (h) providing educational resources and information (to enable access to users to educational instructions within the tool/task as they use it, as described herein). Such information will be context sensitive, such that each tool or feature the platform offers will contain unique information specific to the form field or feature where the user is working. For example, a user will be able to click on an information icon contain in each section to view information specific to the user and their role in the portal. As described earlier, the information will be updated based on user activity and updates will be immediately available to users, creating a highly adaptive environment. In some embodiments, the portal will be configured to validate each entry into free form text on forms to determine if there is PII (personally identifiable information) present in the data, as well as validate the task before a user can successfully save or submit the task. In one example, the algorithm used to validate the text entries works from a library of regular expressions. These regular expressions allow the portal to check for keywords and relevant numeric sequences. The regular expressions are written to address the following categories: date of birth, social security number, tax identification number, member number, address, checking, debit card numbers, credit card numbers, account number and policy number. If there is PII captured, the portal will implement steps to ensure the PII is treated with proper information security protocols. Thus, the platform can serve as a centralized tool consolidating tools previously distributed across multiple apps into one central location.

Figure 5:
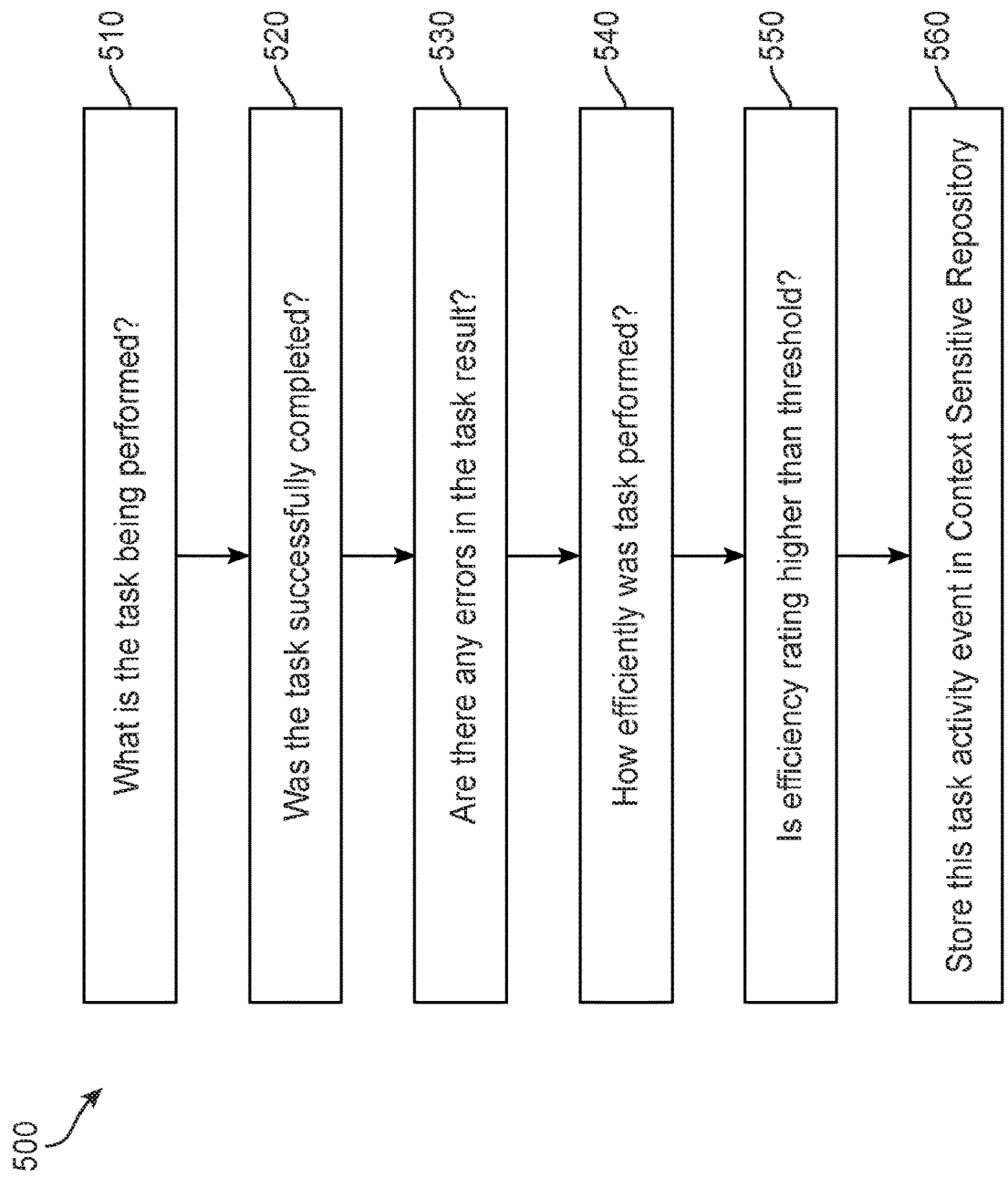
FIG. 5 is a flow diagram of a process of identifying in-app activity for input into a deep learning model, according to an embodiment.
Figure 6:
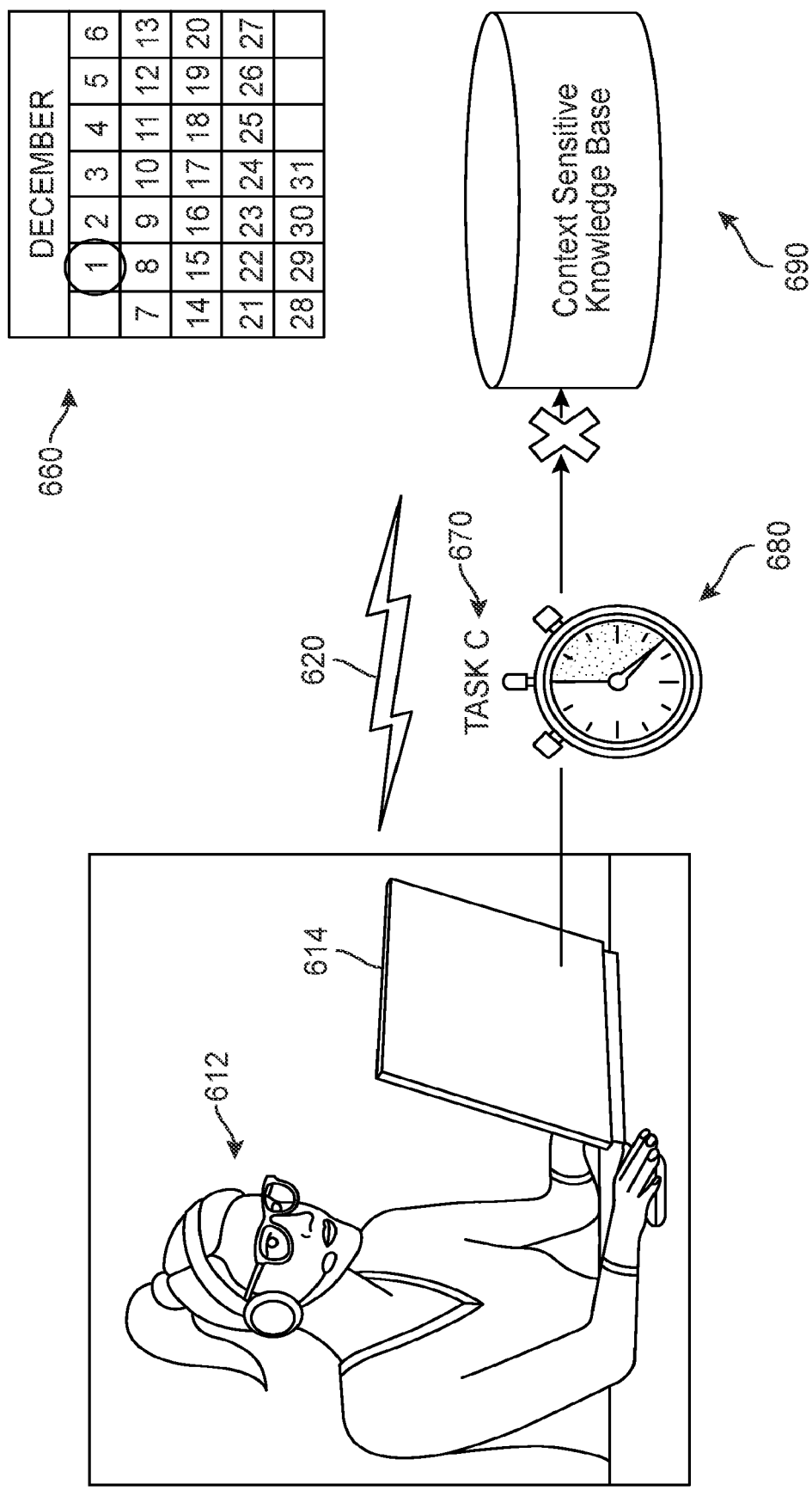
FIG. 6 is an illustration of a first user accessing an application at a first time to perform a task, according to an embodiment.

Referring now to FIG. 5, for purposes of clarity, a flow diagram 500 depicting a process of selecting training data for the model is shown. In a first stage 510, the task is identified ("What is the task being performed?"). Once the task has been identified, the system will assess whether the task was successfully (i.e., fully, all steps finished) completed in a second stage 520. In addition, validation can occur in a third stage 530 ("Are there any errors in the task result?") to determine whether the task was completed accurately. A fourth stage 540 determines how efficient the performance was, and a fifth stage 550 compares the calculated efficiency rating with a predetermined threshold ("Is efficiency rating higher than threshold?"). Finally, if the rating was higher than the threshold, the activity data is stored in the knowledge repository in a sixth step 560 ("Store this task activity event in context sensitive repository").

Referring now to FIGS. 6-10, an example of a data collection and dynamic education process for a platform that may occur via some of the proposed embodiments is depicted. In this scenario, a third user 612 is accessing an issue management platform ("platform"), such as the platform described in FIG. 2, via a third computing device ("third device") 614 on a first date 660 (e.g., December 1$^{st}$). The third user 612 is interacting with the platform services over a network connection ("network") 620 and performing a Task "C" 670. As symbolized by a first stopwatch 680, the third user 612 does not complete the task successfully, accurately, and/or within a duration that would designate her activity as potential training data. Thus, the system disregards the data and precludes it from storage in a context sensitive knowledge base 690 associated with the platform.

Figure 7:
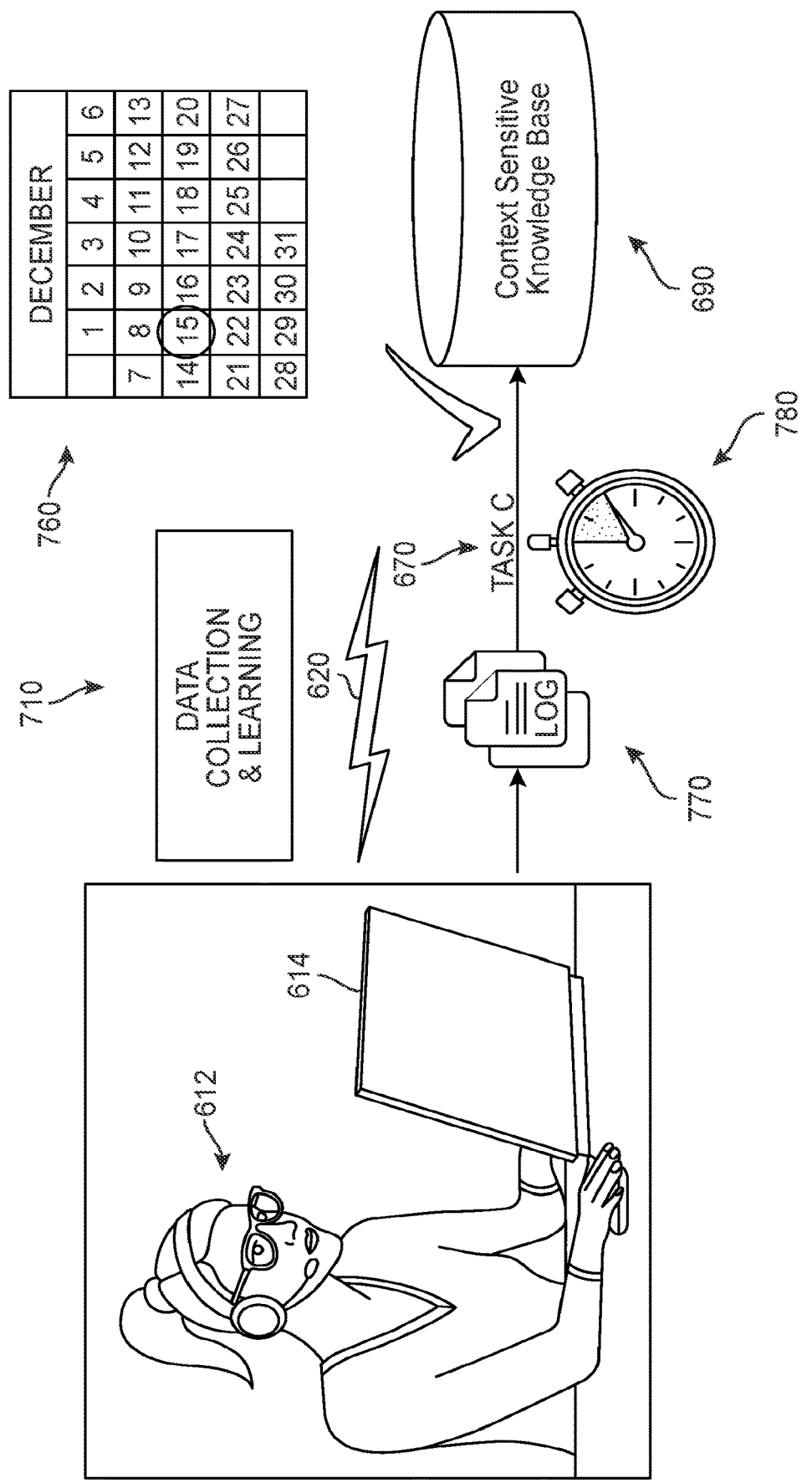
FIG. 7 is an illustration of the first user accessing the application at a second time to perform the task, according to an embodiment.

As discussed above, users of an app can become more experienced over time and learn new approaches, techniques, steps, and/or shortcuts for performing a task that previously had been challenging. In FIG. 7, the third user 612 is shown accessing the platform services on a second date 760 (e.g., December 15$^{th}$) that occurs after the first date 660 of FIG. 6. The third user 612 is again performing Task "C" 670. As symbolized by a second stopwatch 780, the third user 612 does indeed complete the task successfully, accurately, and/or within a duration that would designate her activity as potential training data. Thus, the system selects her now highly rated efficient data and submits it for storage in context sensitive knowledge base 690 associated with the platform.

Figure 8:
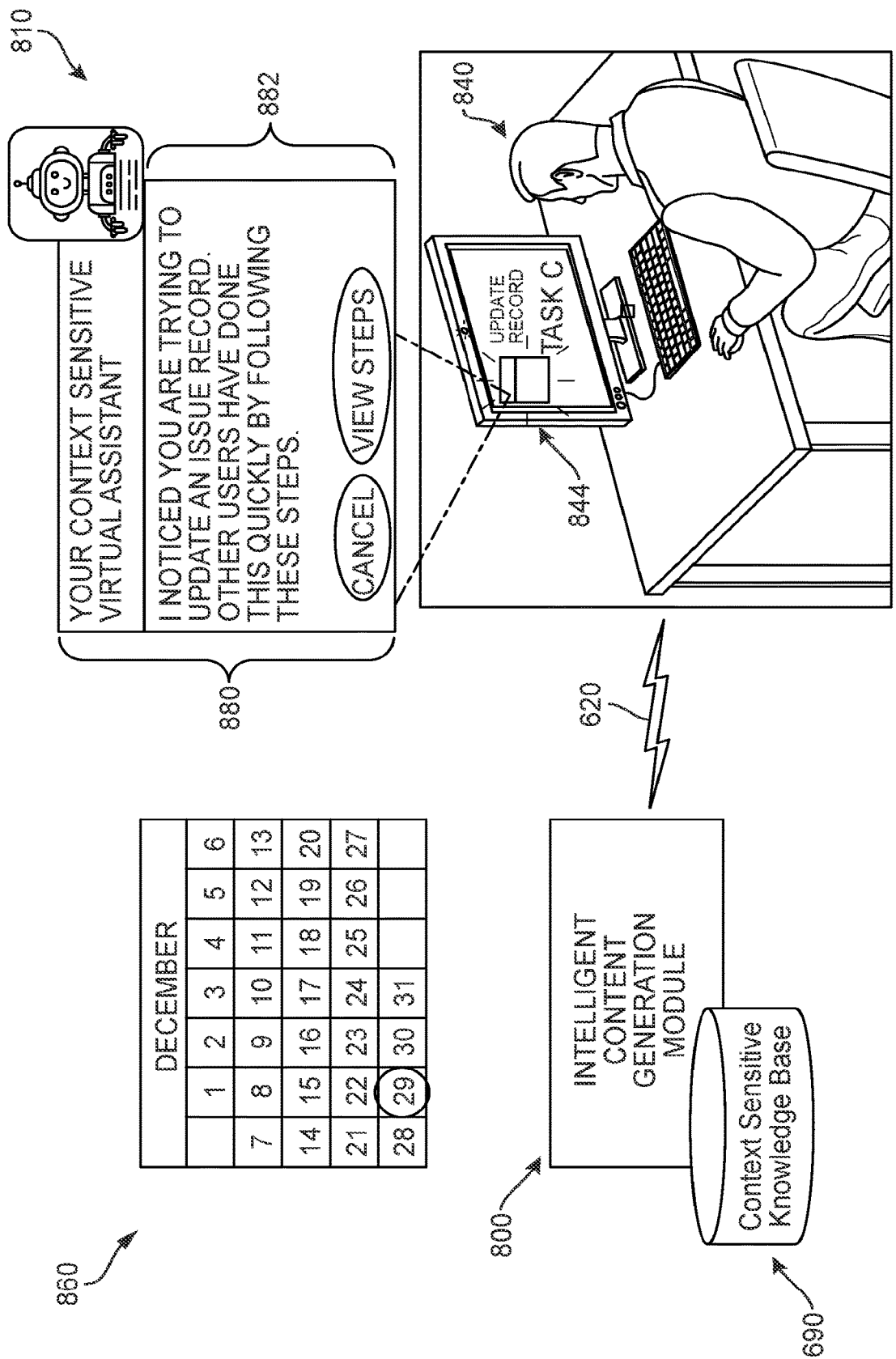
FIG. 8 is an illustration of a second user accessing the application to perform the task, according to an embodiment.

In FIG. 8, a fourth user 840 is shown accessing the platform from a fourth computing device ("fourth device") 844 on a third date 860 (e.g., December 29$^{th}$) that occurs after the second date 760 of FIG. 7. The fourth user 840 is also attempting to perform Task C, but is a new user to this feature, and has been on the same step (issue update) of Task C for a period longer than has been determined to be necessary to complete this step. The system tracks and receives this information and determines a triggering event has occurred, thereby initiating a dynamic virtual assistant service ("assistant") 810. The assistant 810 displays an interactive help window 880 to fourth user 840 in which a first content 882 ("I noticed you are trying to update an issue record. Other users have done this quickly by following these steps" and two selectable options "Cancel" or "View Steps") is shown. The assistant 810 is provided with up-to-date content by an intelligent content generation module 800 (similar to intelligent task content generator 270 discussed in FIG. 2) which will adapt its generated content based on the data stored in context sensitive knowledge base 690 for Task C.

Figure 9:
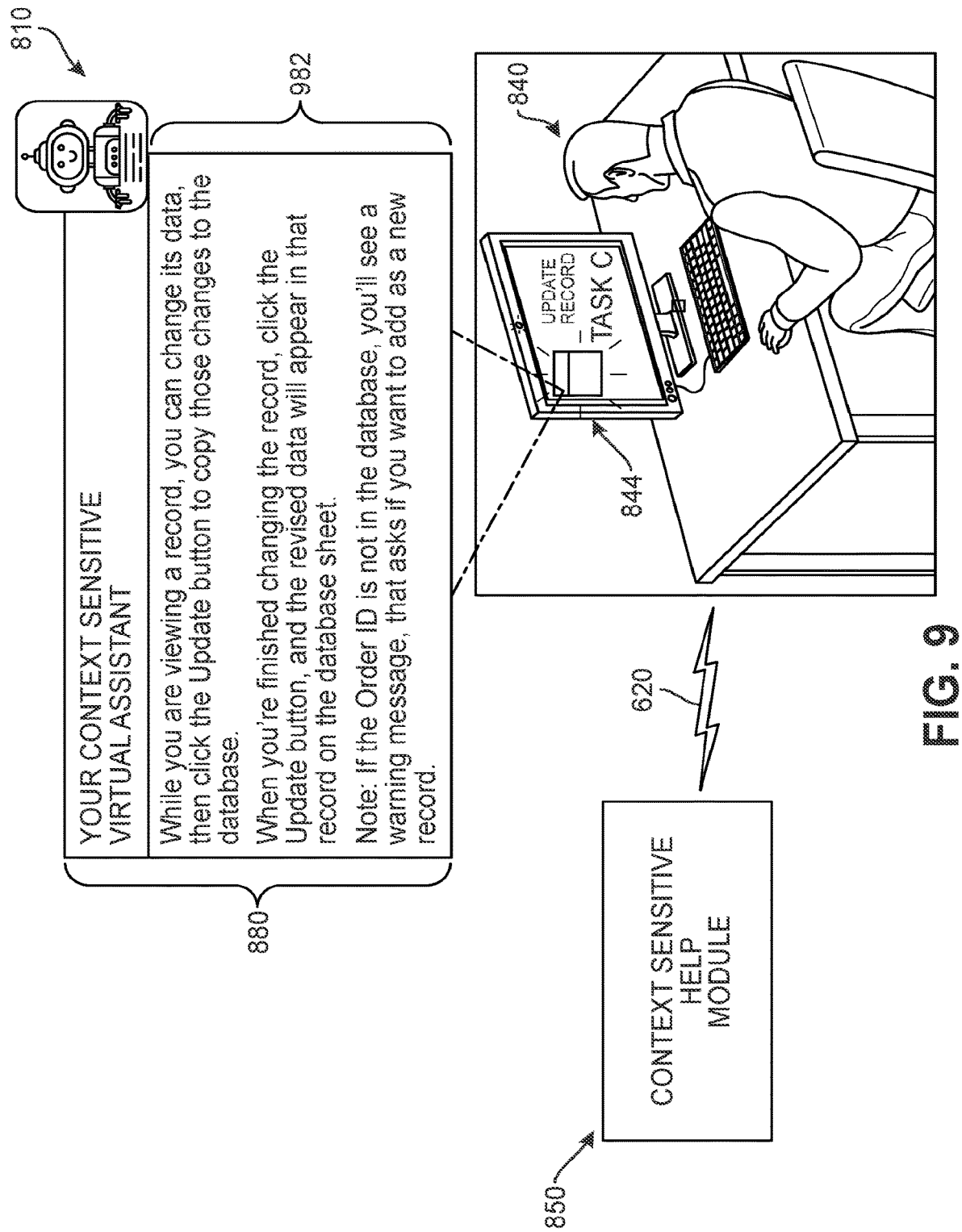
FIG. 9 is an illustration of the second user viewing automatically generated information about the task based on the first user's activity data, according to an embodiment.
Figure 10:
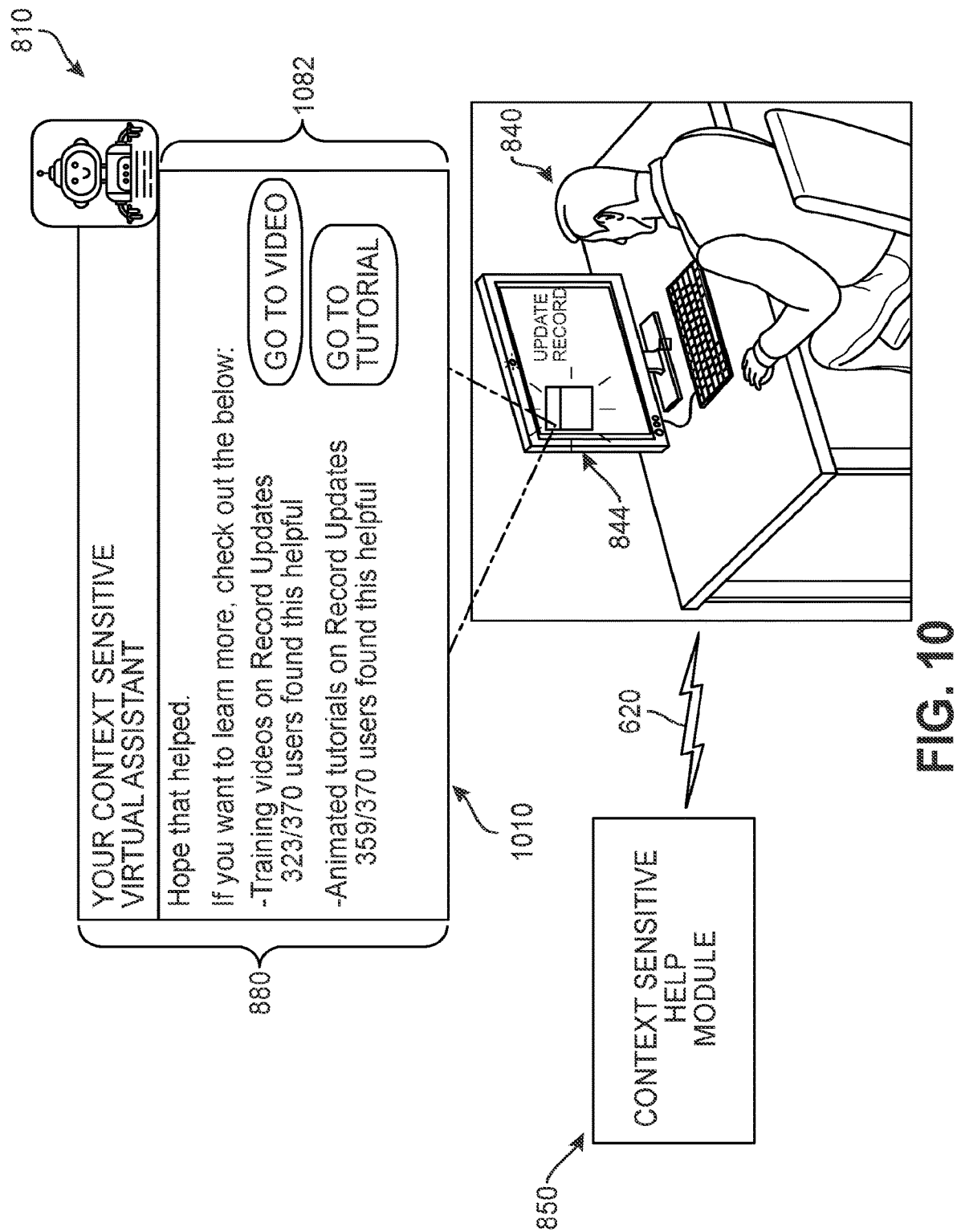
FIG. 10 is an illustration of the second user viewing additional information about the task, according to an embodiment.

The fourth user 840 has selected to view the suggested steps in FIG. 9. In this example, the assistant 810 presents a second content 982 in interactive help window 880, where second content 982 is based at least in part on user activity for third user 612 in FIGS. 6 and 7. The fourth user 840 is able to refer to these directions to complete the Task C more efficiently, as if they themselves had the same level of experience as the third user for this task. In some embodiments, the assistant 810 can provide a "walk-through" where each step of the process is shown with active guidance based on the information stored in the knowledge repository, similar to an in-person expert teaching the novice how to go through each aspect of the task. For example, the assistant 810 can produce a tutorial based on the highly rated user activity. The tutorial can be interactive, where the user follows on-screen instructions in order to complete the task successfully. In some embodiments, the system can also be configured to present additional content such as a third content 1082 that can take advantage of the additional resources related to Task C stored in the repository, as shown in FIG. 10.

Figure 11:
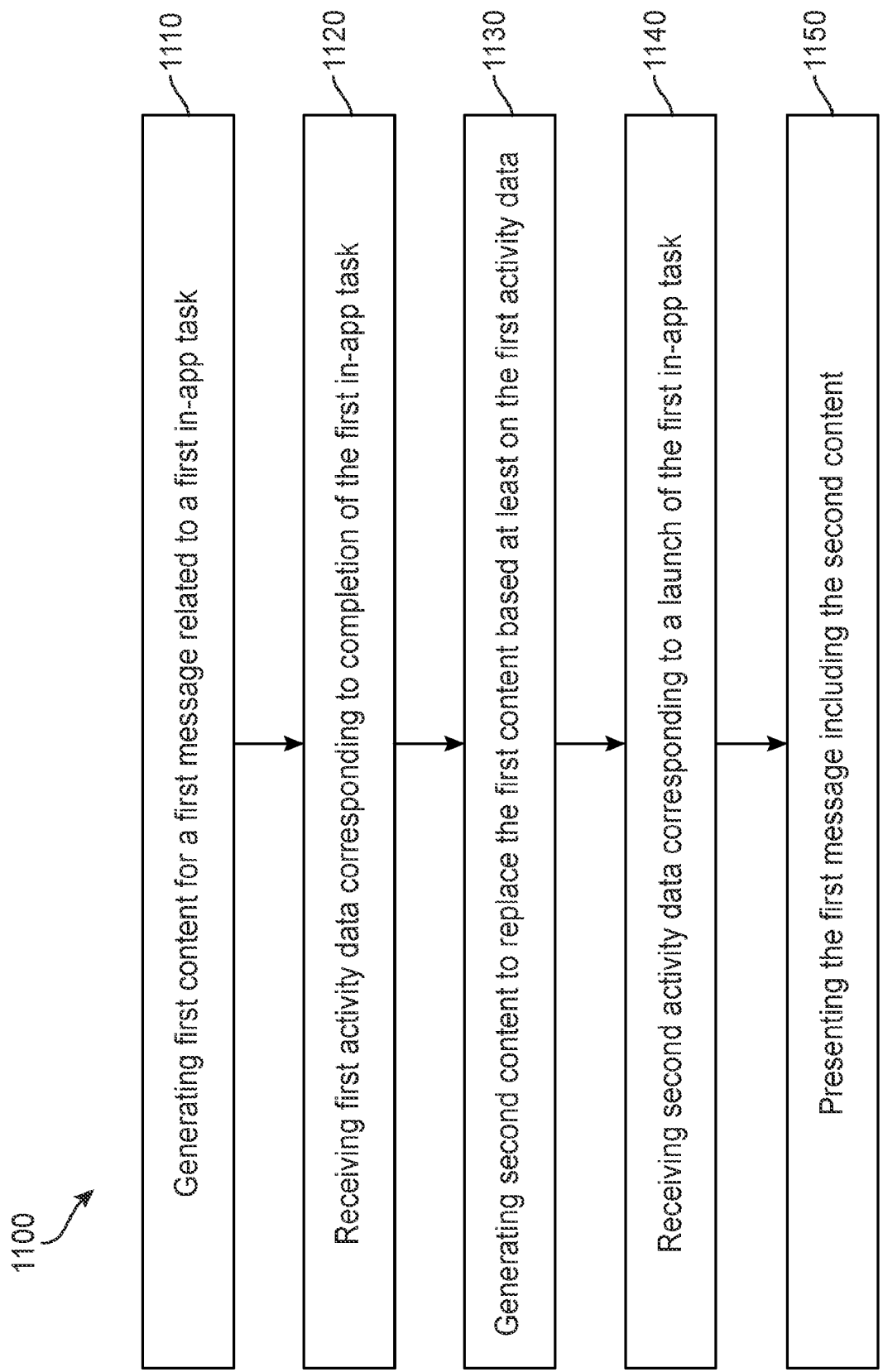
FIG. 11 is a flow diagram of a process for automatically generating and providing dynamic content to users of a platform, according to an embodiment.

FIG. 11 is a flow chart illustrating an embodiment of a method 1100 for dynamically modifying information presented to a user of an application. The method 1100 includes a first step 1110 of generating, at a first time, first content for a first message related to a first in-app task, and a second step 1120 of receiving, at a second time (subsequent to the first time), first activity data for a first user corresponding to a successful completion of the first in-app task. In addition, the method 1100 includes a third step 1130 of generating, at a third time (subsequent to the second time), second content to replace the first content based at least on the first activity data, and a fourth step 1140 of receiving, at a fourth time (subsequent to the third time), second activity data for a second user corresponding to a launch of the first in-app task. The method 1100 also includes a fifth step 1150 of automatically presenting the first message including the second content to the second user.

In other embodiments, the method may include additional steps or aspects. In one embodiment, the method further includes steps of assessing the first activity data to generate a first efficiency rating, determining that the first efficiency rating is above a first threshold, and inputting the first activity data as training data for a task-specific deep learning network model in order to generate the second content. In one example the first activity data includes a duration in which the first user completed the first in-app task. In such cases, the method can further include determining that the duration is below a second threshold, where the first efficiency rating is based at least on the determination that the duration is below the second threshold.

In another embodiment, the method also includes steps of receiving third activity data for the second user corresponding to the successful completion of the first in-app task, assessing the third activity data to generate a second efficiency rating, determining that the second efficiency rating is below the first threshold, and disregarding the third activity data as potential training data for the task-specific deep learning network model. In some embodiments, the method further includes receiving third activity data indicating a current status of the second user in performing the first in-app task, the current status including a duration in which the second user has been attempting to perform the first in-app task, determining that the duration exceeds a second threshold, where the second efficiency rating is based at least on the determination that the duration exceeds the second threshold.

In one example, the method may also include receiving third activity data for a third user corresponding to a successful completion of the first in-app task, and generating third content to replace the second content based at least on the third activity data. In some other examples, the method additionally includes steps of collecting a plurality of activity data from a user community for the application associated with the first in-app task, selecting a first data set from the plurality of activity data based on an efficiency rating associated with the first data set, and providing the first data set to a task-specific deep learning network model in order to generate the first content.

Furthermore, in some embodiments, the method may include steps of receiving third activity data for the second user corresponding to a successful completion of a second in-app task, and generating third content for a second message related to a second in-app task based at least on the third activity data. In one example, the first user is associated with a certified account. In such cases, the method can include additional steps of selecting the first activity data based on the first user being associated with a certified account, and inputting the first activity data as training data for a task-specific deep learning network model in order to generate the second content. In some other examples, the method also includes steps of receiving third activity data indicating the second user is performing the first in-app task for the first time, and automatically presenting the first message based on the third activity data.

Other methods can also be contemplated within the scope of this disclosure. For example, a method of providing in-app assistance to a user is disclosed. The method includes a first step of receiving first activity data for a first user corresponding to a successful completion of a first in-app task, and a second step of assessing the first activity data to generate a first efficiency rating. In addition, a third step includes determining that the first efficiency rating is above a first threshold, and a fourth step involves presenting, to a second user engaged in the first in-app task, a tutorial regarding the first in-app task, the tutorial being based on the first activity data.

In different embodiments, this method may include additional steps or aspects. In one embodiment, the tutorial includes a visualization of steps performed by the first user in order to complete the first in-app task. In some embodiments, the method may further include steps of receiving second activity data for the first user corresponding to a subsequent successful completion of the first in-app task, assessing the second activity data to generate a second efficiency rating, determining that the second efficiency rating is greater than the first efficiency rating, and presenting, to a third user engaged in the first in-app task, the tutorial regarding the first in-app task, the tutorial being based on the second activity data. In another example, the method can also include steps of receiving second activity data for a third user corresponding to a successful completion of the first in-app task, assessing the second activity data to generate a second efficiency rating, determining that the second efficiency rating is above the first threshold, and presenting, to a fourth user engaged in the first in-app task, the tutorial regarding the first in-app task, the tutorial being based on both the first activity data and the second activity data.

In another aspect, a system is disclosed for modifying the information presented to users of an application. The user's device may include a pre-loaded intelligent system trained by a concurrence of interactions of other users of the same application. In some cases, a subset of such users of the same application have been selected as expert users for training of the intelligent system that is pre-loaded onto the user's device.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random-access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of dynamically modifying information presented to a user of an application, the method comprising:
   generating, at a first time and by a dynamic response system associated with a first application running on a first computing device, first content for a first message related to a first in-app task to be performed via the first application;
   receiving, at a second time from the first application and at a task performance assessor of the dynamic response system, first activity data for a first user corresponding to a successful completion of the first in-app task;
   generating, at the task performance assessor, a first efficiency rating describing a performance of the first user in completing the first in-app task based on the first activity data;
   determining, at the dynamic response system, that the first efficiency rating is above a first threshold and responsively inputting the first activity data as training data to a task-specific deep learning network model;
   identifying, via the task-specific deep learning network model, patterns in the first activity data that increased a likelihood of an efficient performance of the first in-app task:
   generating, at a third time and by the task-specific deep learning network model, second content to replace the first content based at least on the identified patterns;
   receiving, at a fourth time and at a second application running on a second computing device, second activity data for a second user corresponding to a launch of the first in-app task to be performed via the second application; and
   automatically presenting, via the second application, the first message including the second content to the second user.

2. The method of claim 1, wherein the first activity data includes a duration in which the first user completed the first in-app task, and the method further comprises:
   determining that the duration is below a second threshold; and
   wherein the first efficiency rating is based at least on the determination that the duration is below the second threshold.

3. The method of claim 1, further comprising:
   receiving third activity data for the second user corresponding to the successful completion of the first in-app task;
   assessing the third activity data to generate a second efficiency rating;
   determining that the second efficiency rating is below the first threshold; and disregarding the third activity data as potential training data for the task-specific deep learning network model.

4. The method of claim 1, further comprising:
receiving third activity data indicating a current status of the second user in performing the first in-app task, the current status including a duration in which the second user has been attempting to perform the first in-app task;
determining that the duration exceeds a second threshold; and
wherein the second efficiency rating is based at least on the determination that the duration exceeds the second threshold.

5. The method of claim 1, further comprising:
receiving third activity data for a third user corresponding to a successful completion of the first in-app task; and
generating third content to replace the second content based at least on the third activity data.

6. The method of claim 1, further comprising:
collecting a plurality of activity data from a user community for the application associated with the first in-app task;
selecting a first data set from the plurality of activity data based on an efficiency rating associated with the first data set; and
providing the first data set to the task-specific deep learning network model in order to generate the first content.

7. The method of claim 1, further comprising:
receiving third activity data for the second user corresponding to a successful completion of a second in-app task; and
generating third content for a second message related to the second in-app task based at least on the third activity data.

8. The method of claim 1, wherein the first user is associated with a certified account, and the method further comprises:
selecting the first activity data based on the first user being associated with a certified account; and
inputting the first activity data as training data for the task-specific deep learning network model in order to generate the second content.

9. The method of claim 1, further comprising:
receiving third activity data indicating the second user is performing the first in-app task for the first time; and
automatically presenting the first message based on the third activity data.

10. The method of claim 1, wherein the first message includes
a tutorial regarding the first in-app task.

11. The method of claim 10, wherein the tutorial when presented to the second user includes a visualization of steps performed by the first user in order to complete the first in-app task.

12. The method of claim 10, further comprising:
receiving third activity data for the first user corresponding to a subsequent successful completion of the first in-app task;
assessing the third activity data to generate a second efficiency rating;
determining that the second efficiency rating is greater than the first efficiency rating; and
presenting, to a fourth user engaged in the first in-app task, the tutorial regarding the first in-app task, the tutorial being based on the third activity data.

13. The method of claim 10, further comprising:
receiving third activity data for a third user corresponding to a successful completion of the first in-app task;
assessing the third activity data to generate a second efficiency rating;
determining that the second efficiency rating is above the first threshold; and
presenting, to a fourth user engaged in the first in-app task, the tutorial regarding the first in-app task, the tutorial being based on both the first activity data and the third activity data.

14. A system for dynamically modifying information presented to a user of an application, the system comprising a processor and machine-readable media including instructions which, when executed by the processor, cause the processor to:
generate, at a first time and by a dynamic response system associated with a first application running on a first computing device, first content for a first message related to a first in-app task to be performed via the first application;
receive, at a second time from the first application and at a task performance assessor of the dynamic response system, first activity data for a first user corresponding to a successful completion of the first in-app task;
generate, at the task performance assessor, a first efficiency rating describing a performance of the first user in completing the first in-app task based on the first activity data;
determine, at the dynamic response system, that the first efficiency rating is above a first threshold and responsively inputting the first activity data as training data to a task-specific deep learning network model;
identify, via the task-specific deep learning network model, patterns in the first activity data that increased a likelihood of an efficient performance of the first in-app task:
generate, at a third time and by the task-specific deep learning network model, second content to replace the first content based at least on the identified patterns;
receive, at a fourth time and at a second application running on a second computing device, second activity data for a second user corresponding to a launch of the first in-app task to be performed via the second application; and
automatically present, via the second application, the first message including the second content to the second user.

15. The system of claim 14, wherein the first activity data includes a duration in which the first user completed the first in-app task, and the instructions further cause the processor to:
determine that the duration is below a second threshold; and
wherein the first efficiency rating is based at least on the determination that the duration is below the second threshold.

16. The system of claim 14, wherein the instructions further cause the processor to:
receive third activity data for a third user corresponding to a successful completion of the first in-app task; and
generate third content to replace the second content based at least on the third activity data.

17. The system of claim 14, wherein the instructions further cause the processor to:
collect a plurality of activity data from a user community for the application associated with the first in-app task;

select a first data set from the plurality of activity data based on an efficiency rating associated with the first data set; and provide the first data set to the task-specific deep learning network model in order to generate the first content.

18. The system of claim 14, wherein the instructions further cause the processor to:

receive third activity data indicating the second user is performing the first in-app task for the first time; and automatically present the first message based on the third activity data.

19. The system of claim 14, wherein the instructions further cause the processor to:

receive third activity data for the second user corresponding to a successful completion of a second in-app task; and generate third content for a second message related to the second in-app task based at least on the third activity data.

20. The system of claim 14, wherein the first user is associated with a certified account, and the instructions further cause the processor to:

select the first activity data based on the first user being associated with a certified account; and input the first activity data as training data for the task-specific deep learning network model in order to generate the second content.

\* \* \* \* \*